(12) United States Patent
Tsubokawa (10) Patent No.: US 8,844,662 B2
(45) Date of Patent: Sep. 30, 2014

(54) FUEL SYSTEM AND VEHICLE (75) Inventor: Takehisa Tsubokawa, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 329 days.

(21) Appl. No.: 13/386,163

(22) PCT Filed: Jul. 21, 2009

(86) PCT No.: PCT/JP2009/063066
§ 371 (c)(1),
(2), (4) Date: Jan. 20, 2012

(87) PCT Pub. No.: WO2011/010366
PCT Pub. Date: Jan. 27, 2011

(65) Prior Publication Data
US 2012/0115061 A1 May 10, 2012

(51) Int. Cl.
*B60K 15/10* (2006.01)
*H01M 8/04* (2006.01)
*B60K 15/01* (2006.01)
*B60K 15/03* (2006.01)

(52) U.S. Cl.
CPC ............ *H01M 8/04201* (2013.01); *Y02E 60/50* (2013.01); *B60K 2015/03026* (2013.01); *H01M 8/04089* (2013.01); *H01M 8/04208* (2013.01); *H01M 8/0438* (2013.01); *H01M 8/04388* (2013.01); *B60K 2015/03019* (2013.01); *B60K 15/013* (2013.01); *B60K 2015/03315* (2013.01)
USPC ........................................................ 180/69.5

(58) Field of Classification Search
USPC ........ 180/69.5, 69.4, 314, 65.1, 65.21, 65.31; 280/830, 834; 429/443–449; 138/30; 137/505–506, 557; 251/144
See application file for complete search history.

(56) References Cited

U.S. PATENT DOCUMENTS 4,556,077 A * 12/1985 Peyton ........................... 137/112
5,794,979 A * 8/1998 Kasuga et al. ................. 280/834
(Continued)

FOREIGN PATENT DOCUMENTS

CN 1930721 A 3/2007
JP 08-099542 A 4/1996
(Continued)

OTHER PUBLICATIONS

International Search Report mailed Sep. 1, 2009 of PCT/JP2009/063066.
(Continued)

*Primary Examiner* — J. Allen Shriver, II
*Assistant Examiner* — James M Dolak
(74) *Attorney, Agent, or Firm* — Kenyon & Kenyon LLP (57) ABSTRACT The present invention is to provide a fuel system and a vehicle which can improve mountability and assembly ease of parts. A fuel system comprises a fuel storage source; a filling line adapted to connect the fuel storage source to a filling port; a supply line adapted to connect the fuel storage source to a fuel destination; a pressure reducing valve installed in the supply line; a first pressure sensor adapted to detect primary or secondary pressure of the pressure reducing valve; and an assembly which is an integration of the pressure reducing valve and the first pressure sensor. The assembly functions as a pipe fitting inserted in the supply line and has a line branch point for the supply line.

15 Claims, 7 Drawing Sheets (56) References Cited

U.S. PATENT DOCUMENTS

| | | | |
|---|---|---|---|
| 5,992,219 A * | 11/1999 | Otaka | 73/40.5 R |
| 6,708,718 B2 * | 3/2004 | Yamada et al. | 137/255 |
| 6,712,400 B1 | 3/2004 | Yamaji et al. | |
| 6,824,911 B2 * | 11/2004 | Franklin | 429/446 |
| 7,040,432 B2 * | 5/2006 | Kawasaki et al. | 180/65.1 |
| 7,108,027 B2 * | 9/2006 | Horii | 141/311 A |
| 7,520,916 B2 * | 4/2009 | McElroy et al. | 429/412 |
| 7,878,280 B2 * | 2/2011 | Sridhar et al. | 180/65.22 |
| 7,981,559 B2 * | 7/2011 | Yoshida | 429/446 |
| 8,464,818 B2 * | 6/2013 | Uchimura et al. | 180/69.4 |
| 8,707,997 B2 * | 4/2014 | Igarashi | 137/883 |
| 2003/0198846 A1 | 10/2003 | Franklin | |
| 2005/0202292 A1 | 9/2005 | Richards et al. | |
| 2008/0220303 A1 | 9/2008 | Yoshida | |
| 2010/0248061 A1 | 9/2010 | Ishikawa | |
| 2011/0174562 A1 | 7/2011 | Uchimura et al. | |

FOREIGN PATENT DOCUMENTS

| | | |
|---|---|---|
| JP | 11-294698 A | 10/1999 |
| JP | 2000-146071 A | 5/2000 |
| JP | 2002-115800 A | 4/2002 |
| JP | 2002-372197 A | 12/2002 |
| JP | 2004-161055 A | 6/2004 |
| JP | 2006-200564 A | 8/2006 |
| JP | 2006-298371 A | 11/2006 |
| JP | 2007-170443 A | 7/2007 |
| JP | 2008-223784 A | 9/2008 |
| JP | 2009-021150 A | 1/2009 |
| JP | 2009-092191 A | 4/2009 |
| WO | 2006/080551 A1 | 8/2006 |
| WO | 2009/063748 A1 | 5/2009 |

OTHER PUBLICATIONS

Patent Abstracts of Japan, English-language abstract of JP 2006-200564.

English-language machine translation of JP 2006-200564.

Espacenet, English-language abstract of EP1727227(A4) corresponding to CN1930721A.

* cited by examiner

Figure 7 ary or secondary pressure of the pressure reducing valve; and an assembly which is an integration of the pressure reducing valve and the first pressure sensor. The assembly functions as a pipe fitting inserted in the supply line and has a line branch point for the supply line.

FUEL SYSTEM AND VEHICLE

This is a 371 national phase application of PCT/JP2009/063066 filed 21 Jul. 2009, the contents of which are incorporated herein by reference.

TECHNICAL FIELD

The present invention relates to a fuel system which includes a fuel storage source, a filling line adapted to connect the fuel storage source to a filling port, a supply line adapted to connect the fuel storage source to a fuel destination, and a pressure reducing valve installed in the supply line. Also, the present invention relates to a vehicle equipped with the fuel system.

BACKGROUND ART

Conventionally, as a vehicle of this type, a vehicle equipped with a fuel cell system having two hydrogen tanks is known (see Patent Literature 1). Each hydrogen tank is connected to a fuel cell via supply lines in which two lines are integrated into one line. Specifically, each of the two hydrogen tanks is connected with a high-pressure pipe assembly, which is connected collectively to a single line of fuel piping, which is then connected to the fuel cell. A regulator for reducing hydrogen gas pressure is inserted midway in the fuel piping and is placed between the two hydrogen tanks.

CITATION LIST

Patent Literature

Patent Literature 1: Japanese Patent Laid-Open No. 2004-161055 (Paragraph 0017, FIG. 1)

SUMMARY OF INVENTION

Problem to be Solved by the Invention

By the way, in addition to the regulator described above, various parts such as a pressure sensor adapted to detect primary or secondary pressure of the regulator and ports used to check for leakage from pipe junctions in the supply lines are sometimes installed on the supply lines (high-pressure pipe assembly and fuel piping) leading from the hydrogen tanks to the fuel cell. However if a plurality of parts are installed separately, it is sometimes difficult to secure limited mounting space in the vehicle effectively. Also, it is necessary to assemble pipes for each individual part, complicating assembly operations.

An object of the present invention is to provide a fuel system and a vehicle which can improve mountability and assembly ease of parts.

Means for Solving the Problem

To achieve the object above, a fuel system according to the present invention provides comprises the above-described fuel storage source, filling line, supply line, and pressure reducing valve; a first pressure sensor adapted to detect primary or secondary pressure of the pressure reducing valve; and an assembly which is an integration of the pressure reducing valve and the first pressure sensor. The assembly functions as a pipe fitting inserted in the supply line and has a line branch point for the supply line.

According to the present invention, since the pressure reducing valve and first pressure sensor are integrated into the assembly, parts commonality can be enhanced and man-hours of piping assembly operations for the supply line can be reduced, compared to when the reducing valve, the first pressure sensor, and the assembly are installed separately. Also, since the integrated assembly can be handled, mountability can be improved, for example, when the fuel system is mounted on a vehicle. Furthermore, the configuration of the pressure reducing valve and the first pressure sensor enables the first pressure sensor to monitor the primary or secondary pressure of the pressure reducing valve.

Preferably, the assembly may have a first leakage check port at a branch destination from the supply line. This configuration allows the leakage check port to be installed by effectively using the assembly. Also, when a fluid is introduced through the leakage check port, junctions and the like of the supply line in the assembly can be checked for leakage.

Preferably, the pressure reducing valve and the first pressure sensor may be integrated into the assembly on a downstream side of the branch point which corresponds to the side of the fuel destination. This provides a configuration suitable for reducing pressure on the downstream side of the branch point.

Preferably, at least one of an injector, a second pressure sensor, a relief valve, and a third sensor may be further integrated into the assembly, where the injector is installed on a downstream side of the pressure reducing valve and adapted to inject fuel, the second pressure sensor is adapted to detect primary or secondary pressure of the injector, the relief valve is adapted to communicate between the pressure reducing valve and the injector on a supply line, and the third sensor is adapted to detect pressure in the fuel storage source. This configuration allows various parts to be installed by effectively using the assembly, improving assembly ease and mountability.

Preferably, the assembly also may function as a pipe fitting inserted in the filling line. This configuration eliminates the need to install a separate pipe fitting for the filling line. That is, the assembly functions as a pipe fitting for both the supply line and filling line, further facilitating parts commonality.

More preferably, the assembly may have a line branch point for the filling line and have a second leakage check port at a branch destination from the filling line. With this configuration, junctions and the like of the filling line in the assembly can also be checked for leakage.

Preferably, in the assembly, connections of pipes of the supply line and connections of pipes of the filling line may be provided next to each other. Consequently, the connections for the supply line and the connections for the filling line can be separated from each other in the assembly. This makes it possible to make connections intensively by securing piping spaces for the supply line and filling line appropriately in the assembly.

More preferably, the connections of pipes of the supply line may be located above the connections of pipes of the filling line in a direction of gravity. This further can improve workability when the pipes on the side of the filling line are assembled below the pipes on the side of the supply line later than the pipes on the side of the supply line.

Preferably, a plurality of the fuel storage sources may be provided; and the supply line coming from the fuel destination may be branched in the assembly and connected in parallel to each of the fuel storage sources. This allows the assembly to be used as a manifold which gathers together pipes from the plurality of fuel storage sources.

More preferably, the filling line coming from the filling port may be branched in the assembly and connected in parallel to each of the fuel storage sources. This allows the assembly to be similarly used as a manifold which branches the pipe coming from the filling port.

Preferably, the fuel storage sources may be high-pressure tanks each of which includes a tank body and a shoulder continuous with an end of the tank body; and the assembly may be placed between adjacent high-pressure tanks and faces the shoulder of at least one of the high-pressure tanks. This can reduce damage to the high-pressure tanks, for example, in case the vehicle carrying the high-pressure tanks comes into collision.

Preferably, the fuel destination may be a fuel cell.

The present invention provides a vehicle equipped with the above-described fuel system according to the present invention. Thus, the present invention can provide a vehicle with improved assembly ease of pipes in the supply line and improved vehicle-mountability of parts (the pressure reducing valve, first pressure sensor, assembly, and the like) on the supply line.

EMBODIMENTS FOR CARRYING OUT THE INVENTION

A fuel system and a vehicle according to preferred embodiments of the present invention will be described below with reference to the accompanying drawings. The fuel system will be described herein taking a fuel cell system as an example. The fuel cell system can be mounted on vehicles such as fuel cell hybrid vehicles (FCHVs), electric cars, and hybrid cars. However, the fuel cell system is also applicable to stationary power supplies as well as various movable bodies (e.g., shipping, aircraft, and robots) other than vehicles.

First Embodiment

Figure 1:
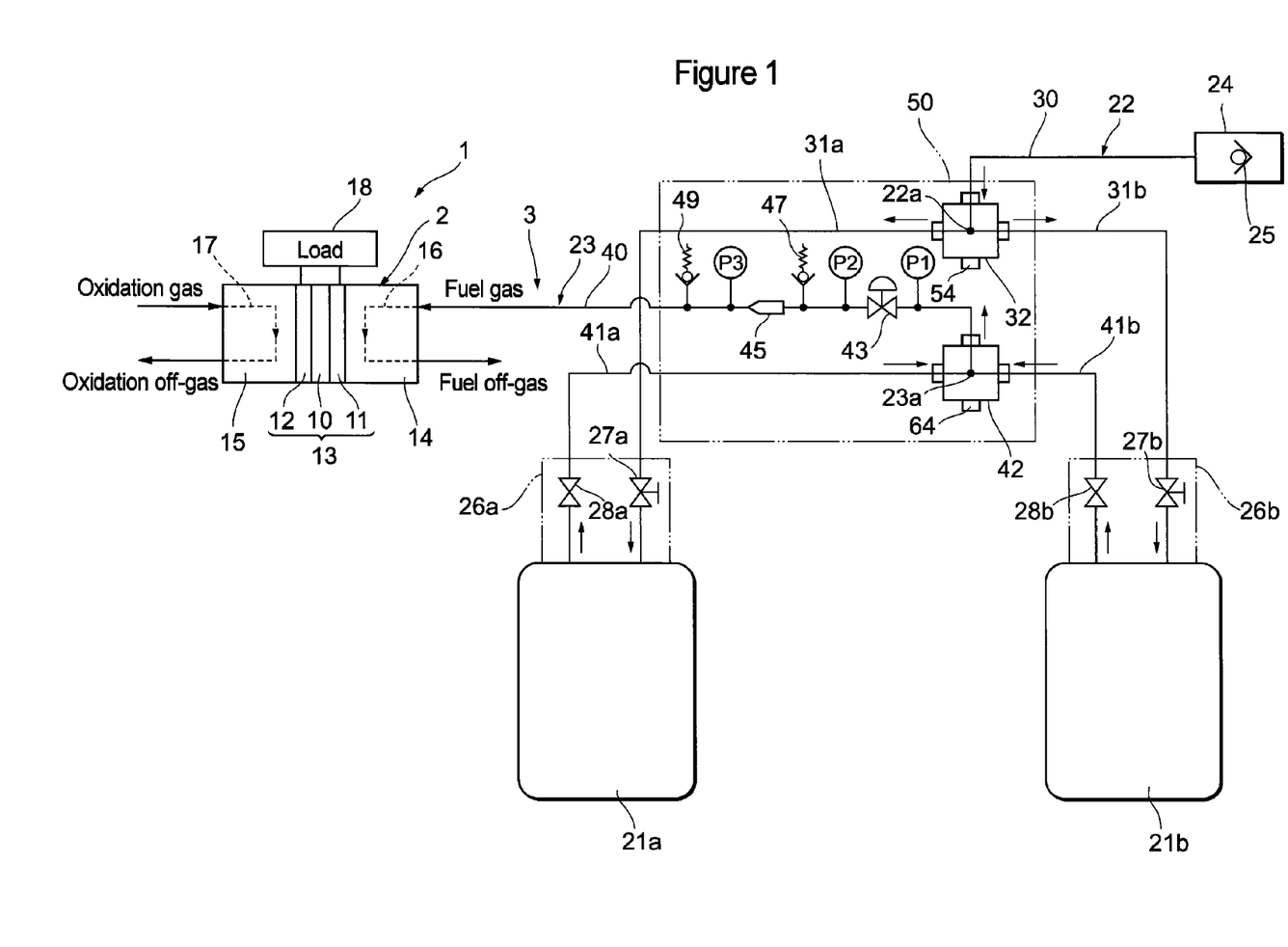
FIG. 1 is a block diagram showing a fuel system according to a first embodiment of the present invention.

As shown in FIG. 1, a fuel cell system 1 includes a fuel cell 2, a fuel gas system 3, and oxidation gas system. The fuel gas and oxidation gas are collectively referred to as reactive gases. The fuel gas is, for example, hydrogen gas while the oxidation gas is, for example, air.

The fuel cell 2 is made up of solid polymer electrolyte fuel cells organized into a stacked structure in which a large number of single cells are stacked together. For convenience of explanation, FIG. 1 schematically shows a structure of the single cell in the fuel cell 2. The single cell includes an MEA (membrane electrode assembly) which comprises an electrolyte membrane 10, a fuel electrode 11, and an air electrode 12. The electrolyte membrane 10 is an ion-exchange membrane made of fluorocarbon resin, for example. The fuel electrode 11 and the air electrode 12 are installed on opposite sides of the electrolyte membrane 10. The single cell includes a pair of separators 14 and 15 placed so as to sandwich the fuel electrode 11 and the air electrode 12 from both sides. The fuel cell 2 generates electric power by means of electrochemical reactions between the fuel gas supplied to a fuel gas channel 16 of the separator 14 and the oxidation gas supplied to an oxidation gas channel 17 of the separator 15. The electric power generated by the fuel cell 2 is supplied to a load 18 such as a traction motor.

The fuel gas system 3 includes two fuel tanks 21a and 21b, a filling line 22 which branches midway, and a supply line 23 which is gathered together midway. The fuel tanks 21a and 21b may be either high-pressure tanks that store high-pressure hydrogen gas or hydrogen absorption tanks that store a hydrogen storage alloy capable of reversibly absorbing and releasing hydrogen. In the case of the high-pressure tanks, the high-pressure tanks store hydrogen gas, for example, at 35 MPa or 70 MPa. Any number of fuel tanks not less than two can be used and, for example, four fuel tanks may be provided. According to the present embodiment, each of the fuel tanks 21a and 21b is a high-pressure tank which has a tank body and shoulders at opposite ends of the tank body. Incidentally, although not illustrated, fuel off-gas discharged from the fuel cell 2 may be circulated back to the fuel cell 2 by leading to the supply line 23 again.

The fuel tanks 21a and 21b are connected in parallel to a filling port 24 via the filling line 22 and connected in parallel to the fuel cell 2, which is a fuel destination, via the supply line 23. During filling with fuel gas, the filling port 24 is connected to a filling nozzle of a fuel gas filling facility (e.g., a fuel gas station). The filling port 24 is fitted with a check valve 25 that prevents fuel gas which has flowed backward from being released outside through the filling port 24.

Valve assemblies 26a and 26b which integrally incorporate various valves, sensors, and the like are screwed into the fuel tanks 21a and 21b. Fuel gas is filled into and released from the fuel tanks 21a and 21b via the valve assemblies 26a and 26b. The valve assemblies 26a and 26b have manual valves 27a and 27b in a passage communicating with the filling line 22, and shutoff valves 28a and 28b in a passage communicating with the supply line 23. The shutoff valves 28a and 28b, which are, for example, solenoid shutoff valves, shut off the fuel gas released from the respective fuel tanks 21a and 21b. Incidentally, regulators and the like may be incorporated into the valve assemblies 26a and 26b.

The filling line 22 includes three pipes in total: a common filling pipe 30 communicating with the filling port 24 and individual filling pipes 31a and 31b communicating with the fuel tanks 21a and 21b. The pipes 30, 31a, and 31b are connected at one end to a filling manifold unit 32 which has a line branch point 22a for the filling line 22. The filling manifold unit 32 is provided with three connection ports for connecting with the pipes 30, 31a, and 31b as well as a leakage check port 54 communicating with the filling line 22. The fuel gas supplied through the filling port 24 is divided in the filling manifold unit 32 and filled into the fuel tanks 21a and 21b.

The supply line 23 includes three pipes in total: a common supply pipe 40 communicating with the fuel cell 2 and individual supply pipes 41a and 41b communicating with the fuel tanks 21a and 21b. The pipes 40, 41a, and 41b are connected at one end to a supply manifold unit 42 which has a line branch point 23a for the supply line 23. The supply manifold unit 42 is provided with three connection ports for connecting with the pipes 40, 41a, and 41b and a leakage check port 64 communicating with the supply line 23. The fuel gas released from the fuel tanks 21a and 21b merges together in the supply manifold unit 42 and supplied to the fuel cell 2. If only one of the shutoff valves 28a and 28b is opened, fuel gas is released from only one of the fuel tanks 21a and 21b and supplied to the fuel cell 2 without merging of the fuel gas in the supply manifold unit 42.

A pressure reducing valve 43 and an injector 45 are inserted in the pipe 40 of the supply line 23. Also, a relief valve 47 is installed between the pressure reducing valve 43 and the injector 45 so as to branch from the pipe 40. Furthermore, a relief valve 49 is similarly installed downstream of the injector 45. The pressure reducing valve 43 is intended to reduce the pressure of the fuel gas and may be any of mechanical, electrical, and electromagnetic types. The injector 45 is, for example, a solenoid-driven on-off valve and adjusts supply pressure and supply flow rate of the fuel gas supplied to the fuel cell 2, with high accuracy, for example, by duty cycle control. The relief valve 47, which is normally closed, is actuated mechanically or electrically to release fuel gas outside the pipe 40 when pipe pressure between the pressure reducing valve 43 and the injector 45 reaches or exceeds a predetermined pressure. Similarly, the relief valve 49 is actuated to release fuel gas outside the pipe 40 when pipe pressure downstream of the injector 45 reaches or exceeds a predetermined pressure.

Three pressure sensors P1, P2, and P3 are installed on the supply line 23. The pressure sensor P1 detects primary pressure of the pressure reducing valve 43, i.e., fuel gas pressure upstream of the pressure reducing valve 43. Also, the pressure sensor P1 can detect pressures inside the fuel tanks 21a and 21b, respectively. The pressure sensor P2 detects secondary pressure of the pressure reducing valve 43 by being installed between the pressure reducing valve 43 and the injector 45. The pressure sensor P3 detects secondary pressure of the injector 45 by being installed downstream of the injector 45. The injector 45 and the pressure sensors P1 to P3 are connected to a controller (not shown) of the fuel cell system 1, and the controller controls the injector 45 based on a detection result produced by at least one of the pressure sensors P2 and P3. If the pressure reducing valve 43 is an electric or electromagnetic type, the pressure reducing valve 43 is connected to the controller and controlled based on a detection result produced by at least one of the pressure sensors P1 and P2.

Multiple parts surrounded by a chain double-dashed line 50 in FIG. 1 are configured into a single part, i.e., an assembly. That is, the assembly 50 integrally incorporates the filling manifold unit 32, the supply manifold unit 42, the pressure reducing valve 43, the injector 45, the relief valves 47 and 49, and the pressure sensors P1 to P3 into a single body.

Figure 2:
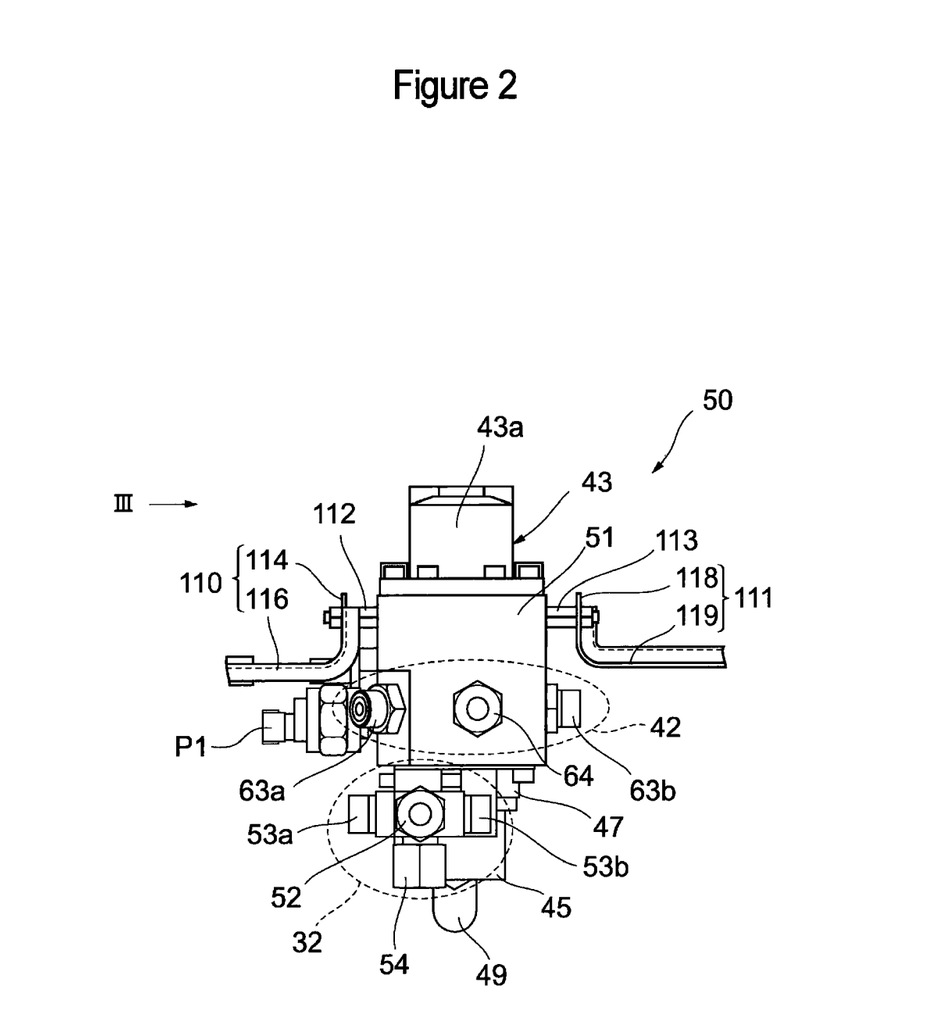
FIG. 2 is a side view showing an assembly contained in the fuel system shown in FIG. 1.
Figure 3:
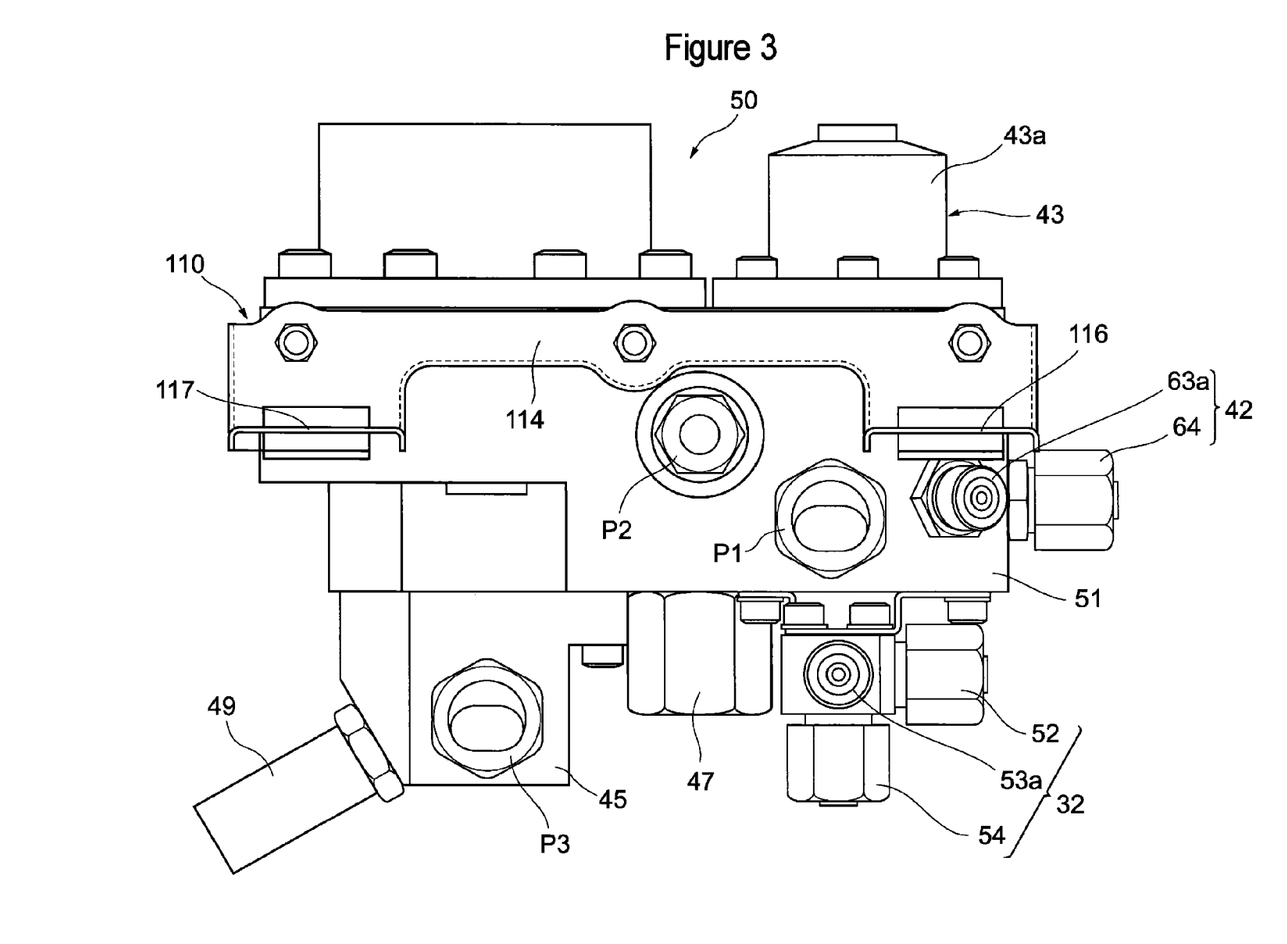
FIG. 3 is a front view showing the assembly contained in the fuel system shown in FIG. 1, as viewed in a direction of arrow III in FIG. 2.

As shown in FIGS. 2 and 3, the body 51 of the assembly 50 is made of material (e.g., SUS316L) resistant to hydrogen embrittlement and integrally incorporates various parts including the pressure reducing valve 43. Although not illustrated, a filling channel and a supply channel are formed in the body 51, where the filling channel communicates with the pipes 30, 31a, and 31b of the filling line 22 and the supply channel communicates with the pipes 40, 41a, and 41b of the supply line 23. First, integration of the filling manifold unit 32 and the supply manifold unit 42 into the body 51 will be described below, and then integration of other parts will be described.

The filling manifold unit 32 and the supply manifold unit 42 are installed next to each other in the body 51. Specifically, ports 52, 53a, 53b, and 54 of the filling manifold unit 32 are mounted under the body 51 in a direction of gravity, and ports 63a, 63b, and 64 of the supply manifold unit 42 are mounted above the ports 52, 53a, 53b, and 54.

The ports 52, 53a, and 53b of the filling manifold unit 32 are installed at a same height level and connected with ends on one side of the filling-side pipes 30, 31a, and 31b, for example, from a horizontal direction. The leakage check port 54 installed pointing downward is used for leakage checks on the filling side and is normally closed with a plug. As shown in FIG. 1, the leakage check port 54 is located at one of line branch destinations of the filling line 22 and communicates with the filling line 22.

The ports 63a and 63b of the supply manifold unit 42 are installed at a same height level and connected with ends on one side of the supply-side pipes 41a and 41b, for example, from a horizontal direction. The leakage check port 64 is used for leakage checks on the supply side and is normally closed with a plug. As shown in FIG. 1, the leakage check port 64 is located at one of line branch destinations of the supply line 23 and communicates with the supply line 23. Incidentally, although not illustrated, a port to be connected with one end of the pipe 40 is also mounted in the body 51, pointing downward.

Since the filling manifold unit 32 and the supply manifold unit 42 are pipe fittings inserted in the filling line 22 and the supply line 23, respectively, the assembly 50 acting as a single part functions as both the pipe fittings inserted in the filling line 22 and the supply line 23. Incidentally, according another form, mounting locations of the ports 52, 53a, 53b, and 54 in the filling manifold unit 32 may be changed. For example, leakage check ports may be provided at locations of the ports 52, 53a, and 53b. Also, mounting locations of the ports (63a, 63b, 64, and the like) in the supply manifold unit 42 may be changed as well.

The leakage checks are tests conducted to verify sealing ability of junctions after pipes are assembled. The leakage check on the filling side involves introducing leakage check gas into the filling line 22 through the leakage check port 54 and detecting the presence or absence of gas leakage from pipe junctions (52, 53a, and 53b) and the like in the filling manifold unit 32. During the check, the manual valves 27a and 27b of the valve assemblies 26a and 26b are kept closed. On the other hand, the leakage check on the supply side involves introducing leakage check gas into the supply line 23 through the leakage check port 64 and detecting the presence or absence of gas leakage from pipe junctions (63a and 63b) and the like in the supply manifold unit 42. During the check, the shutoff valves 28a and 28b of the valve assemblies 26a and 26b are kept closed. Inert gas such as helium is used as the leakage check gas, but available leakage check methods are not limited to those which use gas.

Next, integration of the pressure reducing valve 43, the injector 45, the relief valves 47 and 49, and the pressure sensors P1 to P3 into the body 51 will be described with reference to FIGS. 2 and 3.

The pressure reducing valve 43 is mounted on the body 51 from above. The pressure reducing valve 43 is integrated into the body 51 when a protrusion 43a is firmly bolted to an upper face of the body 51. For example, the pressure reducing valve 43 has a diaphragm, a valve disc, and a valve seat in the body 51, and a pressure-regulating spring on the protrusion 43a sticking out of the body 51. The diaphragm is disposed in a horizontal direction while the valve disc and the pressure-regulating spring are disposed in the direction of gravity. Due to differences between a secondary-side pressure acting on a lower face of the diaphragm and a force of the pressure-regulating spring acting on an upper face of the diaphragm, the valve disc moves in an up-and-down direction, reducing the fuel gas pressure.

The injector 45 is mounted to the body 51 from below and thereby integrated into the body 51. The injector 45 has, for example, a valve disc, a valve seat, a coil, an iron core, and a plunger and ejects fuel gas downward in FIGS. 2 and 3. The valve disc is disposed in the same direction as the valve disc of the pressure reducing valve 43, i.e., in the direction of gravity. When the coil is energized, the iron core is magnetized, attracting the plunger and the valve disc and thereby causing the valve disc to be spaced away from the valve seat. Conversely, when the coil is de-energized, the valve disc abuts the valve seat. As the valve disc moves in this way, opening and closing the injector 45, the supply pressure and supply flow rate of the fuel gas are adjusted with high accuracy. Incidentally, a port (not shown) to be connected with one end of the pipe 40 of the supply line 23 is provided in lower part of the injector 45.

The relief valve 47 is mounted to the body 51 from below between the pressure reducing valve 43 and the injector 45 and thereby integrated into the body 51. The relief valve 49 is mounted to the body 51 from below, protruding obliquely below the injector 45 and behind the body 51. When relieving the fuel gas, the relief valves 47 and 49 release the fuel gas downward and obliquely downward, respectively. The relief valves 47 and 49 may have the same structure, but the relief valve 49 may be made smaller in size than the relief valve 47. This is because the relief valve 49 releases fuel gas at lower pressure than does the relief valve 47.

The pressure sensors P1 to P3 are mounted to a left flank of the body 51 and thereby integrated into the body 51. The pressure sensor P1 is installed in a neighborhood of the pressure reducing valve 43, the pressure sensor P2 is installed in a neighborhood of the relief valve 47, and the pressure sensor P3 is installed in a neighborhood of the injector 45. The pressure sensors P1 to P3 have, for example, respective connections and pressure sensing portions and are mounted when the connectors are connected by being screwed into the body 51. Each of the pressure sensing portions includes, for example, a diaphragm (pressure receiving element) installed in the supply channel and a conversion element such as a strain gauge adapted to read changes received by the pressure receiving element. Based on electrical signals from the conversion elements, the controller described above measures the fuel gas pressure. Of the pressure sensors P1 to P3, the size of the pressure sensor P3 with the lowest pressure rating can be made the smallest, as in the case of the relief valves 47 and 49.

Figure 4:
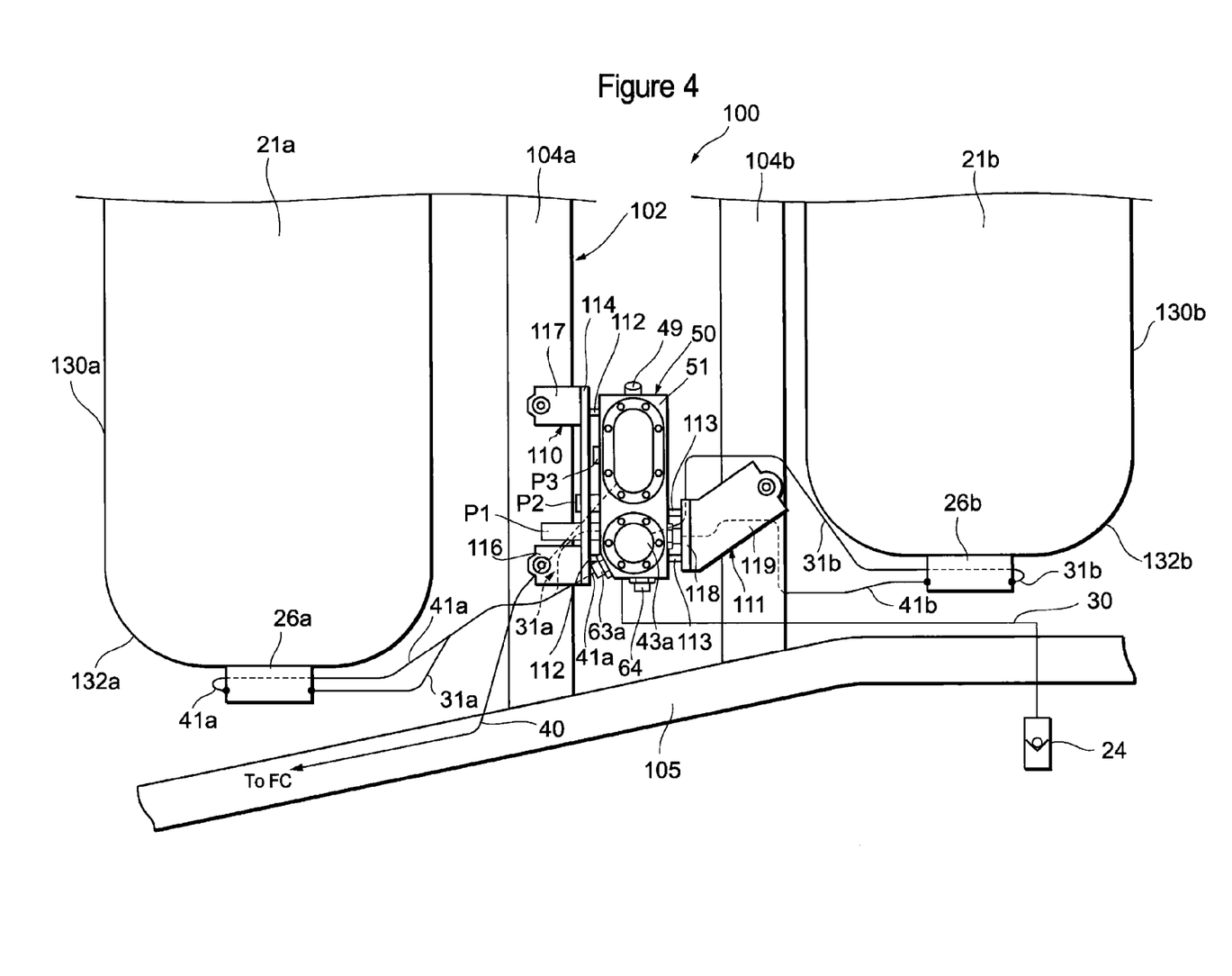
FIG. 4 is a plan view showing a part of a vehicle equipped with the fuel system in FIG. 1.

FIG. 4 is a plan view showing an example of layout around the fuel gas system 3 of a vehicle 100 equipped with the fuel cell system 1.

For example, the vehicle 100 of a typical passenger car type has the filling port 24 on the rear side of a vehicle body. The vehicle 100 has the fuel tanks 21a and 21b mounted on a rear floor in lower part on the rear side and fixed to the rear floor using tank bands. A body frame 102 of the vehicle body includes two cross members 104a and 104b extending in a vehicle width direction and a side member 105 extending in a longitudinal direction of the vehicle. The side member 105 supports ends of the cross members 104a and 104b and the rear floor in conjunction with another side member (not shown). Incidentally, various component devices (e.g., fuel cell 2) of the fuel cell system 1, a power control unit including the above-described controller, a traction motor (load 18) which generates a driving force of the vehicle 100, and the like are placed in front part of the vehicle body.

With the valve assemblies 26a and 26b placed on the same side as the filling port 24, the fuel tanks 21a and 21b are mounted in a horizontal position and arranged in parallel one behind the other in the longitudinal direction of the vehicle. The cross members 104a and 104b are positioned between the mounted fuel tanks 21a and 21b, and the assembly 50 is disposed between the cross members 104a and 104b. The assembly 50 is fixed by being hung by a pair of left and right brackets 110 and 111 from the cross members 104a and 104b.

Specifically, as shown in FIGS. 2 and 4, the assembly 50 includes support members 112 and 113 protruding from flanks of the body 51 in the longitudinal direction of the vehicle. The bracket 110 includes a vertical portion 114 extending in the vehicle width direction at approximately the same height as the body 51 of the assembly 50 and horizontal portions 116 and 117 bent to the front side from opposite bottom edges of the vertical portion 114. Similarly, the bracket 111 includes a vertical portion 118 extending in the vehicle width direction for a distance of approximately half the length of the body 51 and a horizontal portion 119 bent to the rear side from the vertical portion 118. The height level of the horizontal portions 116, 117, and 119 is higher than the ports (63a, 63b, 64, etc.) of the supply manifold unit 42 in the direction of gravity, and piping space is secured for all the ports (52, 53a, 53b, 54, 63a, 63b, 64, etc.).

With this configuration, the bracket 110 has an end of the support member 112 firmly bolted to its vertical portion 114, and its horizontal portions 116 and 117 fixed to an upper face of the cross member 104a via collars and bushes. On the other hand, the bracket 111 has an end of the support member 113 firmly bolted to its vertical portion 118, and its horizontal portions 116 and 117 fixed to an upper face of the cross member 104a via collars and bushes. Consequently, the assembly 50 is fixed by being hung from the cross members 104a and 104b.

Here, available assembly fixing methods are not limited to the one described above, and design changes can be made as appropriate. Preferably, however, the assembly 50 is placed between the fuel tanks 21a and 21b and further inside the vehicle than the ends of at least one of the fuel tanks 21a and 21b. In more detail, the fuel tanks 21a and 21b comprise cylindrical tank bodies 130a and 130b extending in the vehicle width direction and shoulders 132a and 132b formed at ends of the tank bodies 130a and 130b by reducing diameters. The valve assemblies 26a and 26b are screwed into tips of the shoulders 132a and 132b. The fuel tanks 21a and 21b are mounted by being displaced from each other in the vehicle width direction, and the fuel tank 21a is located closer to a flank of the vehicle than is the fuel tank 21b. The assembly 50 is placed so as to face the shoulder 132b of the fuel tank 21b and located further inside the vehicle than the valve assemblies 26a and 26b. This provides measures against damage to the fuel tanks 21a and 21b in case the vehicle 100 is deformed due to a vehicle collision.

In another embodiment, the fuel tanks 21a and 21b may be mounted without displacement in the vehicle width direction. In that case, the assembly 50 can be disposed so as to face both the shoulders 132a and 132b and placed further inside the vehicle than the valve assemblies 26a and 26b.

Next, piping layout will be described. As shown in FIG. 4, the pipes 30, 31a, and 31b on the filling side are laid out without intersecting each other. Specifically, the pipe 30 is connected to the assembly 50 by extending from the filling port 24 in a crank-like fashion. The pipes 31a and 31b are connected to the assembly 50 by extending, respectively, from the assemblies 26a and 26b and running meanderingly. On the other hand, of the pipes 40, 41a, and 41b on the supply side, the pipes 41a and 41b are connected to the assembly 50 by extending, respectively, from the assemblies 26a and 26b and running meanderingly. In this case, the pipes 41a and 41b are installed at a same height level higher than the pipes 31a and 31b in the direction of gravity. An intermediate portion of the pipe 41a is located right above an intermediate portion of the pipe 31a. The pipe 40 is laid with bends, extending from the assembly 50 and running below the pipes 31a 31b, 41a, and 41b. Part of the pipe 40 intersects the pipes 41a and 31a below the intermediate portions of the pipes 41a and 31a.

Advantages of the present embodiment described so far will be described.

According to the present embodiment, since multiple parts placed in the fuel gas system 3 are integrated into the assembly 50, parts commonality, assembly ease, and mountability can be improved compared to when the multiple parts are installed separately.

1. Parts Commonality

In particular, the assembly 50 which functions as pipe fittings of both the filling line 22 and the supply line 23 requires only a single body for the pipe fittings. Also, the assembly 50, which integrates the pressure reducing valve 43, injector 45, and relief valves 47 and 49, allows a body to be shared among these parts.

2. Assembly Ease

If multiple parts of the supply line are installed separately contrary to the present embodiment, it is necessary to assemble pipes of the supply line for each individual part. In contrast, according to the present embodiment, since multiple parts (the pressure reducing valve 43, the injector 45, the relief valves 47 and 49, and the pressure sensors P1 to P3) on the supply line are integrated into the assembly 50, it is only necessary to assemble the pipes 40, 41a, and 41b of the supply line 23 onto the assembly 50 at three locations thereof. This greatly can reduce man-hours of piping assembly operations.

Also, in the assembly 50, the ports (52, 53a, and 53b) connected with the pipes of the filling line 22 and the ports (63a and 63b) connected with the pipes of the supply line 23 are provided by being separated into upper and lower parts. This makes it possible to make pipe connections intensively by securing piping spaces for the pipes appropriately in the assembly 50.

In particular, the ports (52, 53a, and 53b) for the filling line 22 are located below the ports (63a and 63b) for the supply line 23. Consequently, tool space for assembling pipes on the filling line 22 can be secured. This makes it easier to assemble the pipes 30, 31a, and 31b onto the assembly 50 after the pipes 40, 41a, and 41b of the supply line 23 are assembled onto the assembly 50 when performing an assembly operation by manipulating a fastening tool from below the vehicle 100.

3. Mountability

If multiple parts of the supply line are installed separately contrary to the present embodiment, it is necessary to mount each individual part separately on the vehicle, making it difficult to secure mounting space in the vehicle. In contrast, the present embodiment improves mountability on the vehicle 100 because the assembly 50 into which multiple parts are integrated can be treated as a single part. In particular, mounting sites on the vehicle 100 can be reduced, achieving savings in mounting space on the vehicle. This means increased flexibility of piping layout resulting in simplification of piping layout.

4. Collision Safety

In the vehicle 100, the assembly 50 is placed between the fuel tanks 21a and 21b, facing the shoulder of at least one of the fuel tanks 21a and 21b. This makes it possible to place the assembly 50 using dead space between the fuel tanks 21a and 21b effectively. This reduces damage to the fuel tanks 21a and 21b even in case the vehicle 100 is deformed, for example, by a rear-end collision. In addition, since the pipes 30, 31a, 31b, 40, 41, and 41b connected to the assembly 50 run with bends, the pipes can absorb shocks of a vehicle collision.

5. Others

Since the pressure reducing valve 43 and the pressure sensors P1 and P2 are integrated into the assembly 50, the primary pressure or secondary pressure of the pressure reducing valve 43 can be monitored and controlled. Also, since the pressure reducing valve 43 is integrated with the pressure sensor P2 for medium pressure, improved measurement accuracy can be exhibited in case of failure. Similarly, since the injector 45 is integrated with the pressure sensors P2 and P3, the primary pressure or secondary pressure of the injector 45 can be monitored and controlled, and improved measurement accuracy can be exhibited in case of failure. Also, the leakage check ports 54 and 64 are installed in the assembly 50. This makes it possible to check pipe junctions in the filling line 22 and the supply line 23 as well as the filling line 22 and the supply line 23 themselves for leakage using the assembly 50 effectively.

Variation of First Embodiment

The parts to be integrated into the assembly 50 are not limited to those described above (the filling manifold unit 32, the supply manifold unit 42, the pressure reducing valve 43, the injector 45, the relief valves 47 and 49, and the pressure sensors P1 to P3), and other parts may be added. For example, if a pressure sensor is installed on the side of the filling line 22 to detect the fuel gas pressure in the fuel tanks 21a and 21b, the pressure sensor may be integrated into the assembly 50.

On the other hand, from the viewpoint of the present invention, it is sufficient if at least the pressure reducing valve 43 and the one of the pressure sensors P1 and P2 are integrated into the assembly 50. Therefore, at least one of the injector 45, the relief valves 47 and 49, and the pressure sensor P3 may be omitted from the assembly 50. Also, at least one of the leakage check ports 54 and 64 may be omitted from the assembly 50. Incidentally, even if the leakage check ports 54 and 64 do not exist, the assembly 50 can be said to have the branch points 22a and 23a of the filling line 22 and the supply line 23.

Second Embodiment

Figure 6:
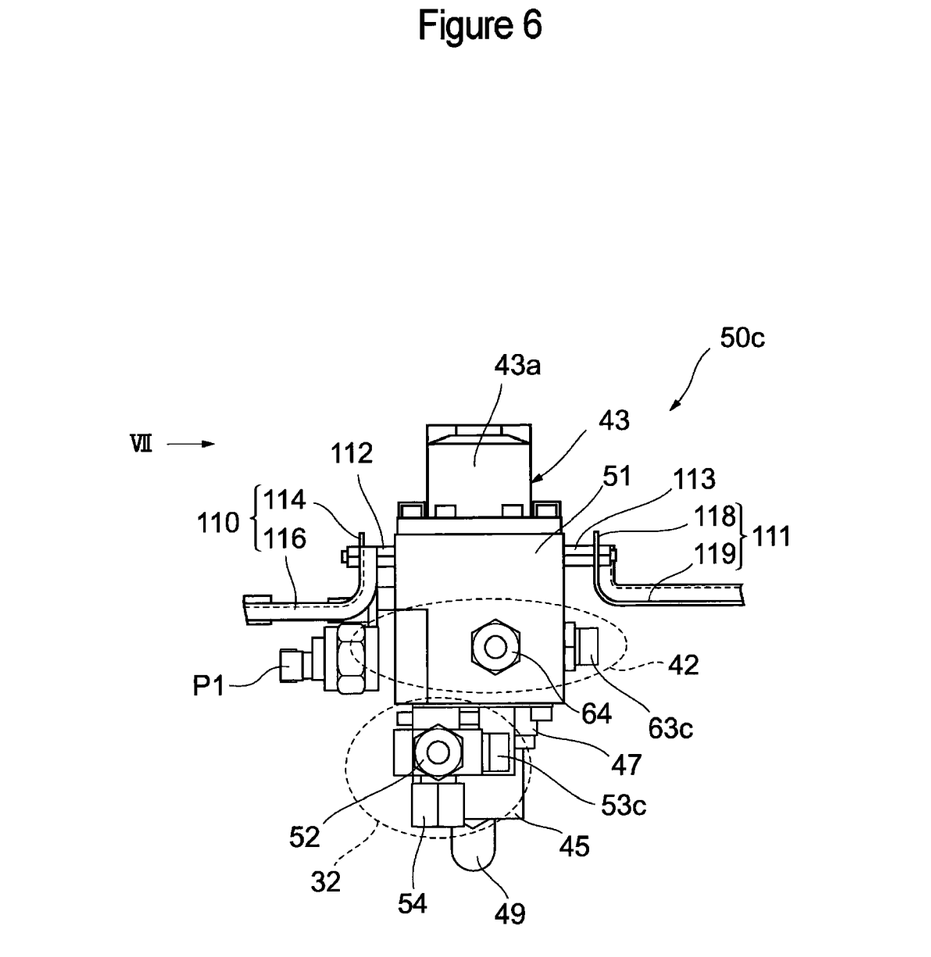
FIG. 6 is a side view showing an assembly contained in the fuel system shown in FIG. 5.
Figure 7:
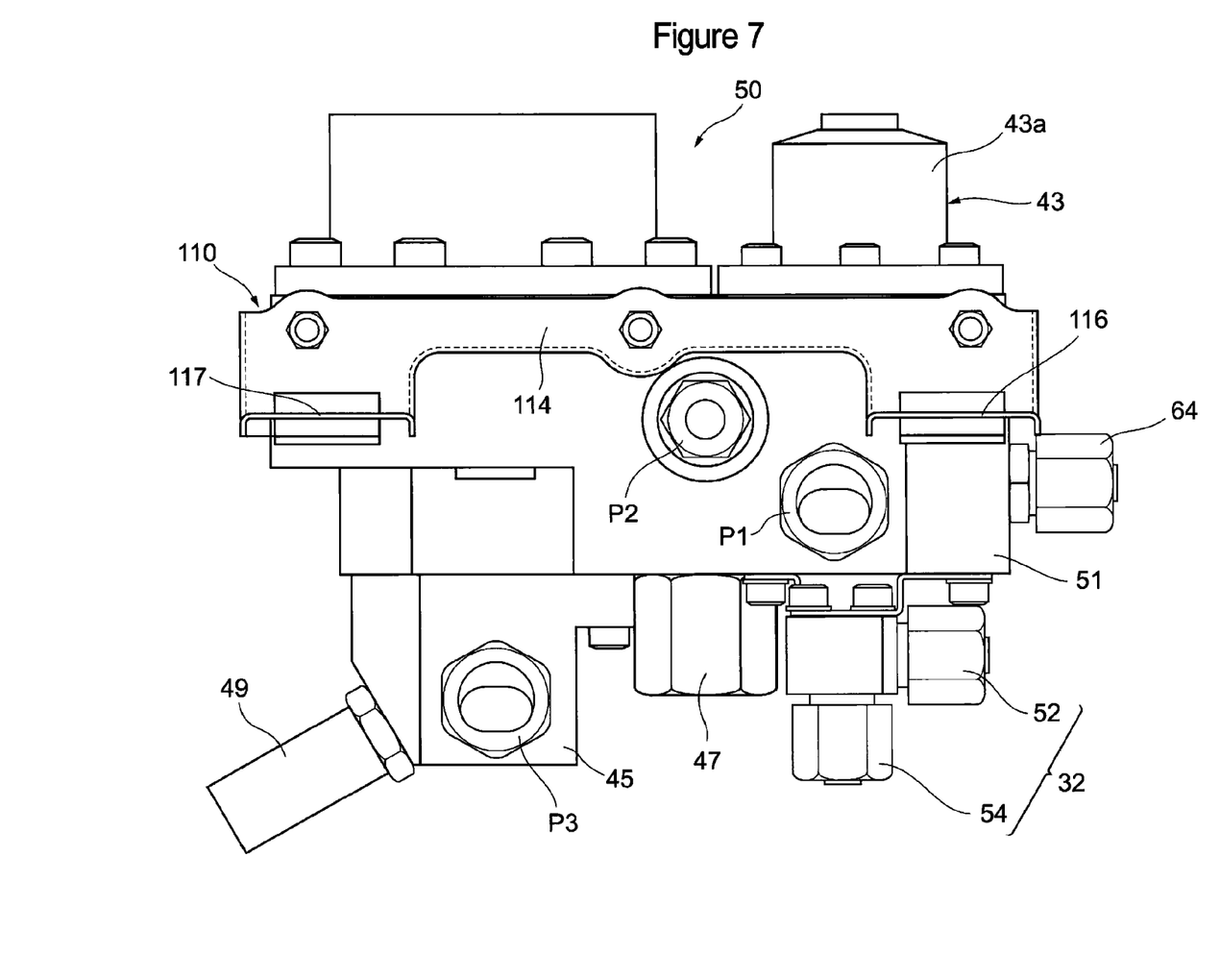
FIG. 7 is a front view showing the assembly contained in the fuel system shown in FIG. 5, as viewed in a direction of arrow VII in FIG. 6.

Next, a second embodiment will be described with reference to FIGS. 5 to 7, focusing on differences. A major difference from the first embodiment lies in that only a single fuel tank is provided. As a result, piping configuration of the fuel gas system as well as configuration of the assembly are changed accordingly. In the following description as well as in FIGS. 5 to 7, components similar to those in the first embodiment are denoted by the same reference numerals as the corresponding components, and description thereof will be omitted.

A valve assembly 26c of a fuel tank 21c includes a manual valve 27c and shutoff valve 28c as in the case of the fuel tanks 21a and 21b described above. The filling line 22 includes two pipes in total: pipes 30 and 31c. The pipe 30 connects the filling port 24 with the port 52 of the filling manifold unit 32 while the pipe 31c connects a port 53c of the filling manifold unit 32 with the fuel tank 21c. The filling manifold unit 32 has a line branch point 22a for the filling line 22 and has a leakage check port 54 at a branch destination of the filling line 22. The supply line 23 includes two pipes in total: pipes 40 and 41c. The pipe 40 connects the fuel cell 2 with a port 62 of the supply manifold unit 42 while the pipe 41c connects a port 63c of the supply manifold unit 42 with the fuel tank 21c. The supply manifold unit 42 has a line branch point 23a for the supply line 23 and has a leakage check port 64 at a branch destination of the supply line 23.

Figure 5:
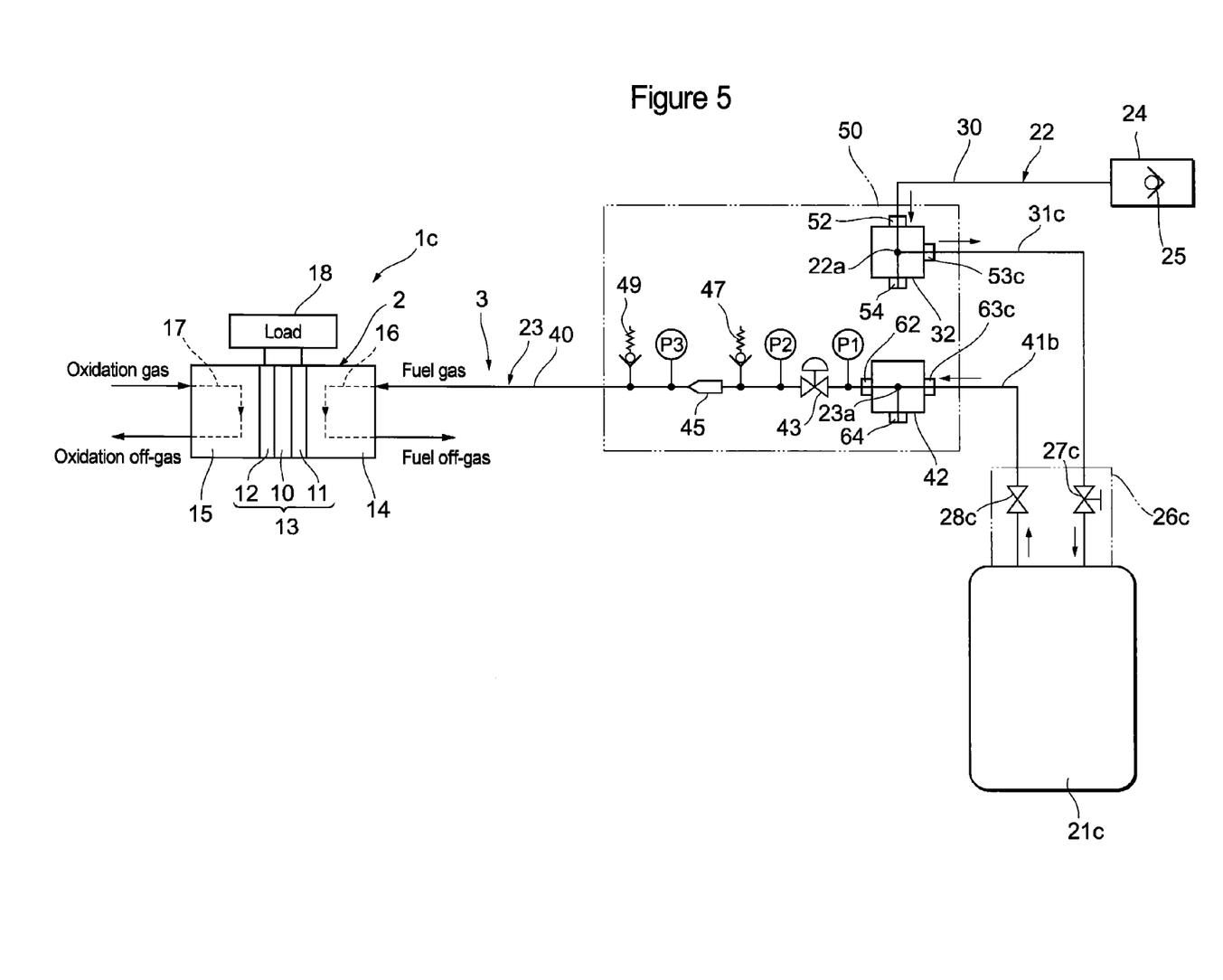
FIG. 5 is a block diagram showing a fuel system according to a second embodiment of the present invention.

An assembly 50c integrally incorporates multiple parts surrounded by a chain double-dashed line in FIG. 5, i.e., the filling manifold unit 32, the supply manifold unit 42, the pressure reducing valve 43, the injector 45, the relief valves 47 and 49, and the pressure sensors P1 to P3 into a single body. As shown in detail in FIGS. 6 and 7, the assembly 50c has a configuration obtained by omitting the filling-side port 53a and the supply-side port 63a from the assembly 50 shown in FIGS. 2 and 3. That is, the filling-side port 53a and the supply-side port 63a on the front side of the vehicle have been omitted. Incidentally, description of a specific configuration resulting from integration of the assembly 50c will be omitted herein.

When a fuel cell system 1c according to the second embodiment is mounted on the vehicle, the assembly 50c can be placed, for example, further on the forward side of the vehicle than the fuel tank 21c by taking rear-end collisions of the vehicle into consideration. In that case, preferably the assembly 50c is placed facing a shoulder of the fuel tank 21c. Regarding the piping layout in this case, the pipes 30, 31c, 40, and 41c can be run with bends from the viewpoint of shock absorption.

Since multiple parts placed in the fuel gas system 3 are integrated into the assembly 50, the second embodiment described above provides advantages similar to those of the first embodiment, i.e., improves parts commonality, assembly ease, and mountability.

The other forms and variation of the first embodiment can also be applied to the second embodiment as appropriate. For example, parts (e.g., a pressure sensor installed on the filling line 22) other than those described above may be integrally incorporated into the assembly 50c or one of the injector 45, the relief valves 47 and 49, and the pressure sensor P3 may be omitted. Also, the leakage check port 54 may be omitted from the assembly 50c. If the leakage check port 54 does not exist, the assembly 50c does not have the branch point 22a for the filling line 22. In that case, the assembly 50c does not have to function as a pipe fitting inserted in the filling line 22. In other words, the assembly 50c does not have to integrally include the filling manifold unit 32. However, from the viewpoint of the present invention, the assembly 50c is integrated with at least the pressure reducing valve 43 and one of the pressure sensors P1 and P2.

Third Embodiment

Next, a third embodiment will be described, focusing on differences. The present embodiment is configured such that the two leakage check ports 54 and 64 in the assembly 50 or 50c are combined into one and that leakage check gas can be introduced into the filling line 22 and the supply line 23 through the single leakage check port. Incidentally, drawings of the third embodiment are omitted.

As an example of this configuration, a communicating channel which interconnects the filling channel and the supply channel in the body 51 of the assembly 50 or 50c is formed in the body 51 and a valve is installed to open and close the communicating channel. Except during leakage checks, the valve is normally closed to keep the filling channel and the supply channel from communicating with each other in the body 51. On the other hand, during a leakage check, the valve is opened to introduce leakage check gas through the single leakage check port. Consequently, the leakage check gas flows through the filling channel and supply channel and then the filling line 22 and the supply line 23. This makes it possible to check all the pipe junctions and the like of the assembly 50 or 50c for gas leakage.

Thus, in addition to the advantages of the first and second embodiments, the third embodiment provides the advantage of being able to practically halve the man-hours of leakage checking.

INDUSTRIAL APPLICABILITY

The fuel cell system according to the present invention can be applied not only to the fuel cell systems 1 and 1c described above, but also to a system which uses natural gas as fuel and a vehicle equipped with such a system for example.

REFERENCE SIGNS LIST 1, 1c: Fuel cell system (fuel system)
2: Fuel cell
21a, 21b, 21c: Fuel tank
22: Filling line
22a: Branch point
23: Supply line
23a: Branch point
24: Filling port
30, 31a, 31b, 31c: Pipe on the filling side
32: Filling manifold unit
40, 41a, 41b, 41c: Pipe on the supply side
42: Supply manifold unit
43: Pressure reducing valve
45: Injector
47, 49: Relief valve
50: Assembly
54: Leakage check port (second leakage check port)
64: Leakage check port (first leakage check port)
100: Vehicle
130a, 130b: Tank body
132a, 132b: Shoulder
P1, P2, P3: Pressure sensor

The invention claimed is:

1. A fuel system comprising a fuel storage source, a filling line adapted to connect the fuel storage source to a filling port, a supply line adapted to connect the fuel storage source to a fuel destination, and a pressure reducing valve installed in the supply line, the fuel system further comprising:
 a first pressure sensor adapted to detect primary or secondary pressure of the pressure reducing valve; and
 an assembly which is an integration of the pressure reducing valve and the first pressure sensor, wherein
 the assembly functions as a pipe fitting inserted in the supply line and has a line branch point for the supply line, and
 the assembly also functions as a pipe fitting inserted in the filling line.

2. The fuel system according to claim 1, wherein the assembly has a first leakage check port at a branch destination from the supply line.

3. The fuel system according to claim 1, wherein the pressure reducing valve and the first pressure sensor are integrated into the assembly on a downstream side of the branch point which corresponds to the side of the fuel destination.

4. The fuel system according to claim 3, wherein an injector installed on a downstream side of the pressure reducing valve and adapted to inject fuel is further integrated into the assembly.

5. The fuel system according to claim 4, wherein a second pressure sensor adapted to detect primary or secondary pressure of the injector is further integrated into the assembly.

6. The fuel system according to claim 4, wherein a relief valve adapted to communicate between the pressure reducing valve and the injector on the supply line is further integrated into the assembly.

7. The fuel system according to claim 5, wherein a third pressure sensor adapted to detect pressure in the fuel storage source is further integrated into the assembly.

8. The fuel system according to claim 1, wherein the assembly has a line branch point for the filling line and has a second leakage check port at a branch destination from the filling line.

9. The fuel system according to claim 1, wherein in the assembly, connections of pipes of the supply line and connections of pipes of the filling line are provided next to each other.

10. The fuel system according to claim 9, wherein the connections of pipes of the supply line are located above the connections of pipes of the filling line in a direction of gravity.

11. The fuel system according to claim 1, wherein:
a plurality of the fuel storage sources are provided; and
the supply line coming from the fuel destination is branched in the assembly and connected in parallel to each of the fuel storage sources.

12. The fuel system according to claim 11, wherein the filling line coming from the filling port is branched in the assembly and connected in parallel to each of the fuel storage sources.

13. The fuel system according to claim 11, wherein:
the fuel storage sources are high-pressure tanks each of which includes a tank body and a shoulder continuous with an end of the tank body; and
the assembly is placed between adjacent high-pressure tanks, so as to face the shoulder of at least one of the high-pressure tanks.

14. The fuel system according to claim 1, wherein the fuel destination is a fuel cell.

15. A vehicle equipped with the fuel system according to claim 1.

* * * * *